United States Patent
Schulte et al.

(10) Patent No.: US 10,578,217 B2
(45) Date of Patent: Mar. 3, 2020

(54) DEVICE HAVING A THROTTLE FOR REDUCING THE FLUSHING STREAM FROM A SANITARY FLUSH BOX, DRAIN VALVE AND SANITARY FLUSH BOX COMPRISING A DEVICE OF THIS TYPE

(71) Applicant: Viega Technology GmbH & Co. KG, Attendorn (DE)

(72) Inventors: Philipp Schulte, Lennestadt (DE); Sebastian Bergmoser, Finnentrop (DE)

(73) Assignee: VIEGA TECHNOLOGY GMBH & CO. KG, Attendorn (DE)

( * ) Notice: Subject to any disclaimer, the term of this patent is extended or adjusted under 35 U.S.C. 154(b) by 0 days.

(21) Appl. No.: 15/659,748

(22) Filed: Jul. 26, 2017

(65) Prior Publication Data
US 2018/0030709 A1 Feb. 1, 2018

(30) Foreign Application Priority Data

Jul. 26, 2016 (DE) ........................ 10 2016 113 772
Jul. 26, 2016 (DE) .................... 20 2016 104 089 U

(51) Int. Cl.
*F16K 3/08* (2006.01)
*E03D 1/14* (2006.01)
(Continued)

(52) U.S. Cl.
CPC ............ *F16K 3/085* (2013.01); *B05B 1/3026* (2013.01); *E03D 1/142* (2013.01); *E03D 5/012* (2013.01);
(Continued)

(58) Field of Classification Search
CPC .. E03D 9/16; E03D 5/012; E03D 1/34; E03D 1/142; E03C 2001/026; E03C 2001/147; F16K 3/03; F16K 3/08; F16K 3/085
(Continued)

(56) References Cited

U.S. PATENT DOCUMENTS

| 523,855 A | * | 7/1894 | Frye | ........................ F16K 3/08 |
| | | | | 137/625.31 |
| 1,310,497 A | * | 7/1919 | Keenan | ..................... E03D 1/34 |
| | | | | 4/378 |

(Continued)

FOREIGN PATENT DOCUMENTS

| DE | 2805038 A1 | 8/1979 |
| DE | 19821648 A1 | 11/1999 |

(Continued)

OTHER PUBLICATIONS

Machine Translation for DE 19821648.*

*Primary Examiner* — Erin Deery
(74) *Attorney, Agent, or Firm* — The Webb Law Firm

(57) ABSTRACT

The invention relates to a device for reducing the flushing stream from a sanitary flush box, in particular a toilet flush box, which contains a drain valve, a drain connection, and a valve seat formed on the drain connection, freeing an outlet opening delimited by the drain connection, said device comprising a throttle, which defines at least one free flow cross section. To provide a device, by means of which the flushing stream from a sanitary flush box can be adjusted, the invention proposes that the throttle, viewed in the flushing stream flow direction, is arranged behind the valve seat on or in the drain connection of the drain valve or in a connection piece receiving the drain connection, the throttle comprising at least two throttle elements, one of which can be rotated relative to the other, the size of the free flow cross section can be changed.

13 Claims, 3 Drawing Sheets

(51) Int. Cl.
 B05B 1/30 (2006.01)
 E03D 5/012 (2006.01)
 *E03C 1/02* (2006.01)

(52) U.S. Cl.
 CPC .. *E03C 2001/026* (2013.01); *E03D 2001/147* (2013.01)

(58) Field of Classification Search
 USPC ..... 4/417, 418, 378, 679, 680; 251/206, 208
 See application file for complete search history.

(56) References Cited

U.S. PATENT DOCUMENTS

| | | | |
|---|---|---|---|
| 1,660,010 A | | 2/1928 | Lemm |
| 2,068,406 A | * | 1/1937 | Freed ................ E03D 1/266 181/234 |
| 2,232,571 A | * | 2/1941 | Stark ................ A01C 7/02 116/277 |
| 2,613,367 A | * | 10/1952 | Denham ............ E03D 1/302 4/391 |
| 3,066,313 A | * | 12/1962 | Pitts ................ E03D 1/34 4/391 |
| 4,598,866 A | * | 7/1986 | Cammack ........ B05B 1/1654 239/447 |
| 4,890,665 A | * | 1/1990 | Vetterli ............ B22D 11/16 164/136 |
| 5,127,438 A | * | 7/1992 | Williams .......... F16K 3/085 137/562 |
| 5,746,415 A | * | 5/1998 | Shimizu ............ E03C 1/08 251/118 |
| 7,147,000 B1 | * | 12/2006 | Chen ................ E03C 1/23 137/362 |
| 2016/0154409 A1 | | 6/2016 | Chen et al. |
| 2017/0227158 A1 | | 8/2017 | Supnekar et al. |

FOREIGN PATENT DOCUMENTS

| | | |
|---|---|---|
| DE | 102015114735 A1 | 3/2017 |
| EP | 2141294 A2 | 1/2010 |
| EP | 3228766 A1 | 10/2017 |
| GB | 28112 | 3/1914 |
| WO | 2016067304 A2 | 5/2016 |
| WO | 2017036877 A1 | 3/2017 |

\* cited by examiner

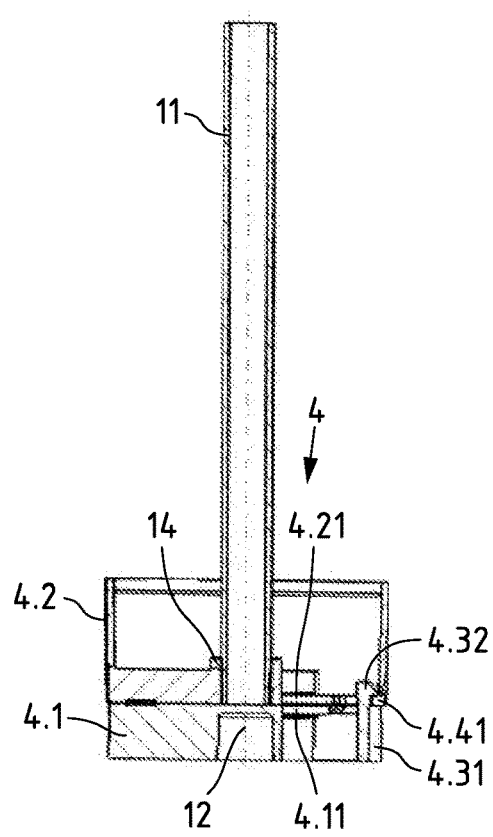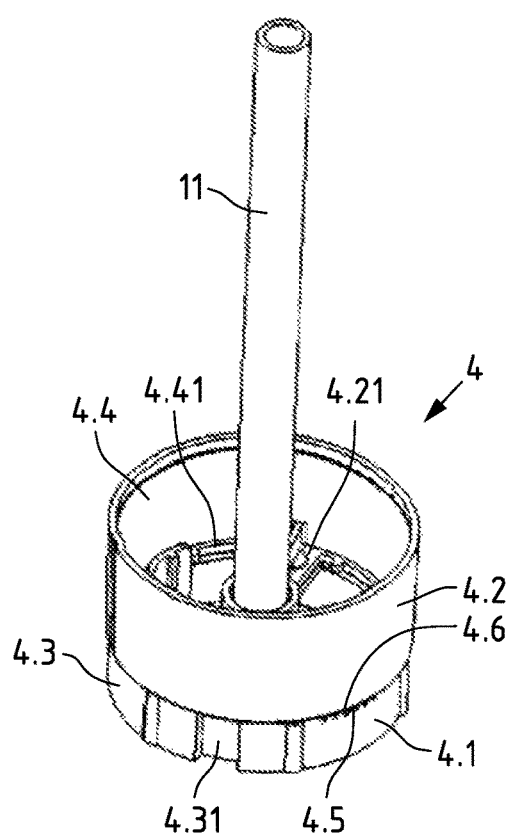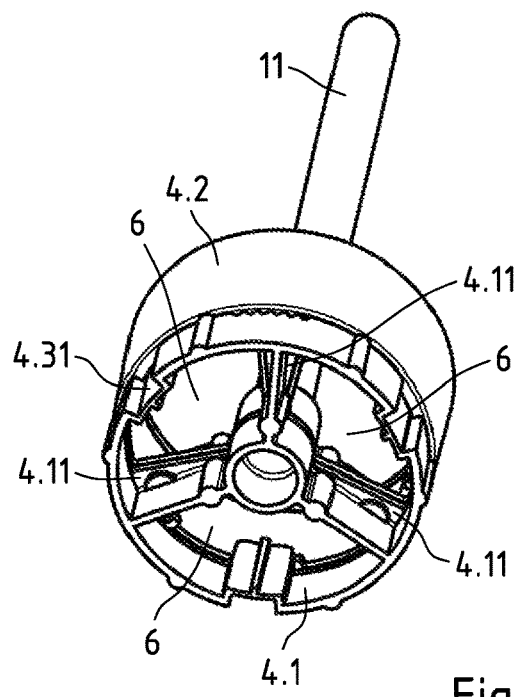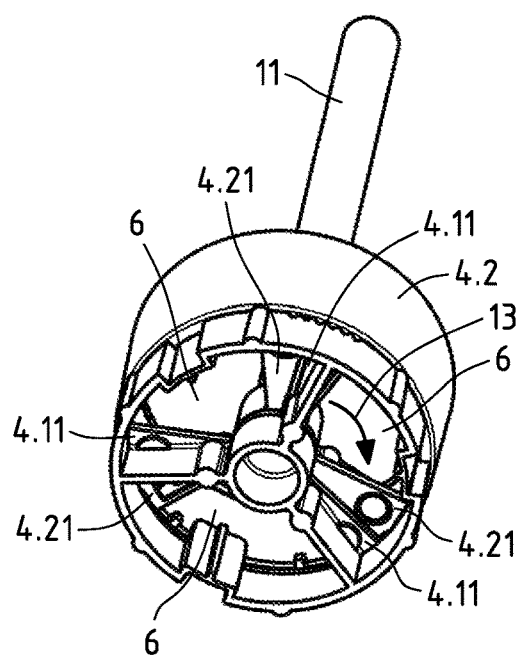

DEVICE HAVING A THROTTLE FOR REDUCING THE FLUSHING STREAM FROM A SANITARY FLUSH BOX, DRAIN VALVE AND SANITARY FLUSH BOX COMPRISING A DEVICE OF THIS TYPE

CROSS-REFERENCE TO RELATED APPLICATIONS

This application claims priority to German Patent Application Nos. 10 2016 113 772.3 and 20 2016 104 089.2 filed Jul. 26, 2016, respectively, the disclosures of which are hereby incorporated in their entirety by reference.

SUMMARY OF THE INVENTION

The invention relates to a device for reducing the flushing stream from a sanitary flush box, in particular a toilet flush box, which contains a drain valve, which has a valve mounting, a valve member that has a sealing surface or seal and is movably mounted in the valve mounting, a drain connection and a valve seat formed on the drain connection, the sealing surface or seal resting on the valve seat in the closed state of the drain valve and, in the open state of the drain valve, freeing an outlet opening delimited by the drain connection, said device comprising a throttle, which defines at least one free flow cross section. Furthermore, the invention relates to a drain valve comprising a throttle of this type as referenced herein. Finally, the invention relates to a sanitary flush box, in particular a toilet flush box, comprising a throttle as referenced herein.

DESCRIPTION OF RELATED ART

Drain valves for sanitary flush boxes, in particular toilet flush boxes, are known in diverse configurations (see, for example, EP 2 141 294 B1).

BACKGROUND OF THE INVENTION

The strength of the flushing stream in a toilet or a urinal depends on the height difference between the flush box and sanitary ware, the flow resistance of the flushing pipe connecting the flush box to the sanitary ware, and the flow resistance of the sanitary ware. If the flushing stream is too strong, this can lead to splashes of water from the sanitary ware onto the toilet seat and/or onto the floor next to the sanitary ware. In order to prevent splashes of water caused by a flushing stream that is too strong, the flushing stream is reduced as required. For this purpose, various throttle rings having different diameters are traditionally placed in the valve seat of the drain valve to reduce the flow cross section in the valve seat. However, adjusting the flushing stream using the various throttle rings is laborious and inconvenient. In addition, individual throttle rings may become lost, which may then prevent a satisfactory adjustment of the flushing stream.

The object of the invention is to provide a device, by means of which the flushing stream from a sanitary flush box can be adjusted more conveniently and reliably.

This object is achieved by a device having the features as explained herein. Furthermore, this object is achieved by a drain valve and by a sanitary flush box, each having the features as referenced herein. Preferred and advantageous embodiments of the solution according to the invention are referenced herein.

The device according to the invention is characterised in that the throttle, viewed in the flushing stream flow direction, is arranged, or can be arranged, behind the valve seat on or in the drain connection of the drain valve or in a connection piece receiving the drain connection, the throttle comprising at least two throttle elements, one of which can be rotated relative to another of the throttle elements such that, by rotating the rotatable throttle element relative to the other throttle element, the size of the at least one free flow cross section can be changed.

The invention provides the possibility of being able to adjust the flushing stream, i.e. the volume stream of the flushing water, by means of preferably only a single adjustable element. Since various throttle rings having different internal diameters therefore no longer have to be placed in the valve seat, adjusting the flushing stream using the device according to the invention is considerably more convenient than using traditional throttle rings. In addition, the invention provides a cost advantage as only a single throttle is required for different adjustments of the flushing stream owing to the invention. The throttle according to the invention can also be referred to as a flushing stream throttle.

The invention is based on the basic idea that a throughopening in the drain region of the flush box for variably reducing the flushing stream strength does not have to be reduced by means of a plurality of different throttle rings having different internal diameters, but that a single adjustable throttle can also be used for this purpose. The device according to the invention is characterised in particular in that it is easy to implement. It can be implemented without a laborious structural modification to an already present drain valve or an already present flush box. This is because the throttle (flushing stream throttle) according to the invention can easily be combined as an additional part with the drain connection of a flush box drain valve or a connection piece of the flush box receiving the drain connection. The drain connection or connection piece can be combined with the variably adjustable throttle as an additional part, for example, by integrally connecting the throttle to the drain connection or connection piece. However, it is preferably provided that the throttle, or at least one of the throttle elements, can be positively and/or non-positively inserted into the drain connection or into the connection piece receiving the drain connection. This makes it possible to mount and remove the throttle in a simple manner. For example, for this purpose the drain connection of the drain valve or the connection piece receiving the drain connection may have a support, preferably an annular groove, for positively connecting the throttle.

A further advantageous embodiment of the device according to the invention is characterised in that the throttle elements are disc-shaped and have web-shaped portions, which define at least two free flow cross sections and taper towards the rotational axis of the rotatable throttle element. On account of this embodiment, the throttle can be combined highly effectively with the connection shape of proven drain valves and sanitary flush boxes. A relatively wide adjustment range for a variable cross section reduction can be implemented by the tapering of the web-shaped portions of the disc-shaped throttle element towards the rotational axis when there is a predetermined internal cross-sectional area of the drain connection or connection piece. The disc-shaped throttle element may have two, three, four or even more web-shaped portions here and therefore correspondingly define many free flow cross sections.

The free flow cross sections delimited by the web-shaped portions of the particular throttle element preferably substantially correspond to a sector of a circle, i.e. the particular free flow cross section is preferably delimited by two concentric, radially spaced apart circle arcs having different arc lengths and by two circle radii.

The web-shaped portions of the particular throttle element may also be referred to as spokes or circle-sector-shaped spokes.

The area size of the particular web-shaped portion is preferably significantly smaller than the area size of the free flow cross section delimited by two of these web-shaped portions of the particular throttle element. This ensures that, even when the throttle elements are maximally rotated with respect to one another to reduce the free flow cross section such that the web-shaped portions of the throttle elements no longer overlap, a free but reduced flow cross section nevertheless still remains. For example, the maximum area size of the free flow cross section delimited by two of the web-shaped portions of the particular throttle element is at least double, preferably more than double, the area size of the particular web-shaped portion.

According to a further advantageous embodiment of the device according to the invention, the web-shaped portions of at least one of the throttle elements are interconnected by an annular portion of the throttle element. This embodiment improves the stability of the particular throttle element. In particular, a particularly reliable connection of the throttle to the drain connection or connection piece can thereby be achieved.

The adjustability of the throttle (flushing stream throttle) according to the invention and therefore the variable cross-sectional reduction in the drain region of the valve seat can be implemented in various embodiments. One embodiment consists, for example, in that the effective size of the at least one free flow cross section can be changed by rotating the rotatable throttle element in steps, in particular latching steps. In this embodiment, the effective size of the at least one free flow cross section can be very conveniently adjusted depending on a specific sanitary ware model and/or a specific height difference between the flush box and sanitary ware. This is because the installer can be provided, for example, with a table in which various sanitary ware models and/or various values are given with respect to the height difference between the flush box and sanitary ware, specific adjustments or latching steps of the flushing stream throttle being assigned to the various sanitary ware models and/or height differences. The installer can then ascertain from the table the adjustment or latching step suitable for the sanitary ware model or height difference in question and accordingly suitably adjust the effective size of the at least one free flow cross section by means of the rotatable throttle element.

A preferred embodiment of the invention provides that latching elements, which secure the adjusted position of the rotatable throttle element relative to the other throttle element and therefore prevent unintentional rotation of the throttle element in the mounted state of the throttle, are formed on the mutually facing end edges of the throttle elements.

An alternative embodiment of the invention is characterised in that the effective size of the at least one free flow cross section can be continuously changed by rotating the rotatable throttle element. This embodiment provides the advantage that the strength of the flushing stream can be very finely changed and thus optimally adjusted.

According to a further advantageous embodiment of the device according to the invention, at least one of the throttle elements is provided with a handle, preferably a rod-shaped handle. The handle is used as a mounting aid for inserting the throttle into the drain connection of the drain valve or into the connection piece of the flush box receiving the drain connection. The handle can preferably be detachably connectable to the throttle element, and so once the throttle has been inserted into the drain connection of the drain valve or into the connection piece of the flush box, said handle can be separated from the throttle. The detachable connection of the handle to the particular throttle element may, for example, be configured as a frictional plug-in connection, bayonet connection or threaded connection.

The rod-shaped handle may, in particular, be bar-shaped or tubular. The frictional plug-in connection is a clamp connection in which the throttle element that can be detachably connected to the handle has a clamp receiving portion (clamp support) for the bar-shaped or tubular handle.

A further advantageous embodiment of the invention is characterised in that the rotatable throttle element is clipped to the other throttle element. For this purpose, the rotatable throttle element, at its annular portion connecting the web-shaped portions, for example has radially inwardly projecting regions, on which radially outwardly projecting latching lugs are formed, each of the latching lugs engaging behind a radially inwardly projecting shoulder, which is formed on the inside of the annular portion of the other throttle element.

As already mentioned above, the object of the invention is also achieved by a drain valve having the features as referenced herein.

The drain valve according to the invention for a sanitary flush box, in particular a toilet flush box, comprises a valve mounting, a valve member that has a sealing surface or seal and is movably mounted in the valve mounting, a drain connection, a valve seat formed on the drain connection, the sealing surface or seal resting on the valve seat in the closed state of the drain valve and, in the open state of the drain valve, freeing an outlet opening delimited by the drain connection, and a throttle, which defines at least one free flow cross section. According to the invention, the throttle, viewed in the flushing stream flow direction, is arranged behind the valve seat on or in the drain connection of the drain valve. The throttle comprises at least two throttle elements, one of which can be rotated relative to another of the throttle elements such that, by rotating the rotatable throttle element relative to the other throttle element, the size of the at least one free flow cross section can be changed.

The drain valve according to the invention makes it possible to adjust the flushing stream by means of a single, variably adjustable throttle.

The throttle of the drain valve according to the invention is preferably mounted within the drain connection of the drain valve. The flushing stream can be adjusted very conveniently and independently of a connection piece of the flush box receiving the drain connection on account of an embodiment of this type. In this case, the installer can ascertain the effective size of the at least one free flow cross section, delimited by the throttle, with the aid of the previously specified table, and adjust this size before the drain valve is installed in the sanitary flush box. Likewise, this size can also be changed or optimised after testing the flushing process and removing the drain valve from the flush box by readjusting the throttle if necessary.

From a structural and functional point of view, it is favourable if at least one of the throttle elements can be positively and/or non-positively inserted into the drain connection of the drain valve. In particular, it is favourable if, according to a further preferred embodiment of the invention, the drain connection of the drain valve has a support, preferably an annular groove, for positively connecting the throttle. This makes it possible to mount the throttle in a simple manner by pushing or clipping it into the connection piece.

Furthermore, the object of the invention is also achieved by a sanitary flush box, in particular the toilet flush box referenced herein.

The flush box according to the invention, in particular toilet flush box, has a connection piece, into which a drain connection of a drain valve can be inserted, the drain valve comprising a valve mounting, a valve member that has a sealing surface or seal and is movably mounted in the valve support, and a valve seat formed on the drain connection, the sealing surface or seal resting on the valve seat in the closed state of the drain valve and, in the open state of the drain valve, freeing an outlet opening delimited by the drain connection, and said flush box comprising a throttle, which defines at least one free flow cross section. According to the invention, the throttle in this solution, viewed in the flushing stream flow direction, is arranged behind the valve seat in the connection piece of the flush box receiving the drain connection, the throttle comprising at least two throttle elements, one of which can be rotated relative to another of the throttle elements such that, by rotating the rotatable throttle element relative to the other throttle element, the size of the at least one free flow cross section can be changed. Thus, a sanitary flush box is provided in which the flushing stream can be variably and conveniently adjusted by means of a single adjustable throttle.

From a structural and functional point of view, it is favourable if at least one of the throttle elements can be positively and/or non-positively inserted into the connection piece of the flush box. It is also favourable if, according to a further preferred embodiment of the invention, the connection piece of the flush box has a support, preferably an annular groove, for positively connecting the throttle. This makes it possible to mount the throttle in a simple manner by pushing or clipping it into the connection piece. The flushing stream can be adjusted very conveniently and independently of the drain valve of the flush box on account of an embodiment of this type. The installer can in turn ascertain the effective size of the at least one free flow cross section, delimited by the throttle, with the aid of the previously specified table, and adjust this size both before and after the drain valve has been installed in the sanitary flush box.

BRIEF DESCRIPTION OF THE DRAWINGS

The invention will be described in greater detail below with reference to the drawings, which show a plurality of embodiments and in which:

FIG. 6 is an axial longitudinal sectional view of a further embodiment of a device according to the invention for variably reducing the flushing stream from a sanitary flush box;

FIGS. 7 and 8 are various perspective views of the device from FIG. 6; and

FIG. 9 shows the device from FIG. 6 in a view corresponding to FIG. 8, one throttle element or the lower throttle element having in this case been rotated, in comparison with FIG. 8, relative to the other throttle element through a specific angle of rotation, and therefore the free flow cross sections are reduced.

DETAILED DESCRIPTION OF THE INVENTION

Figure 1:
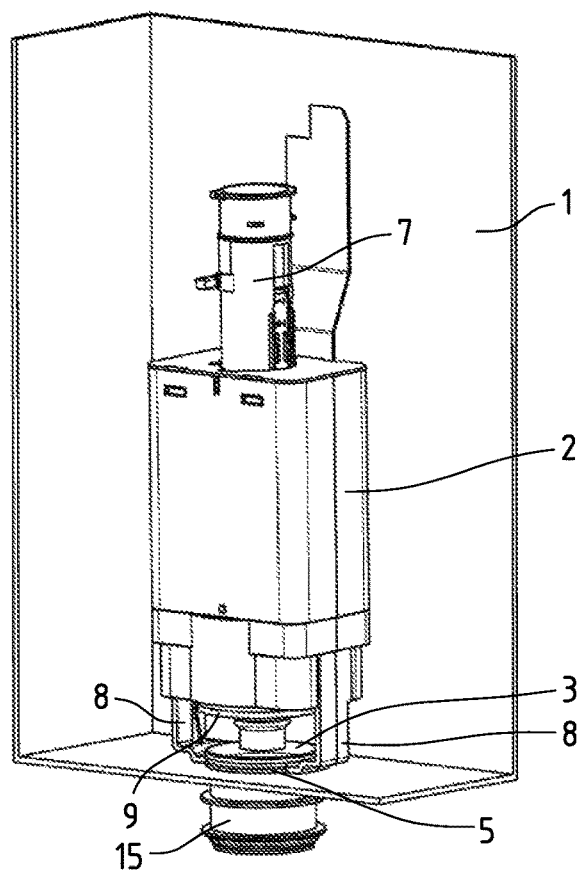
FIG. 1 shows a portion of a flush box, which is shown in a longitudinal section and in a perspective view and which comprises a drain valve that is arranged therein and that is provided with a variable flushing stream throttle.
Figure 2:
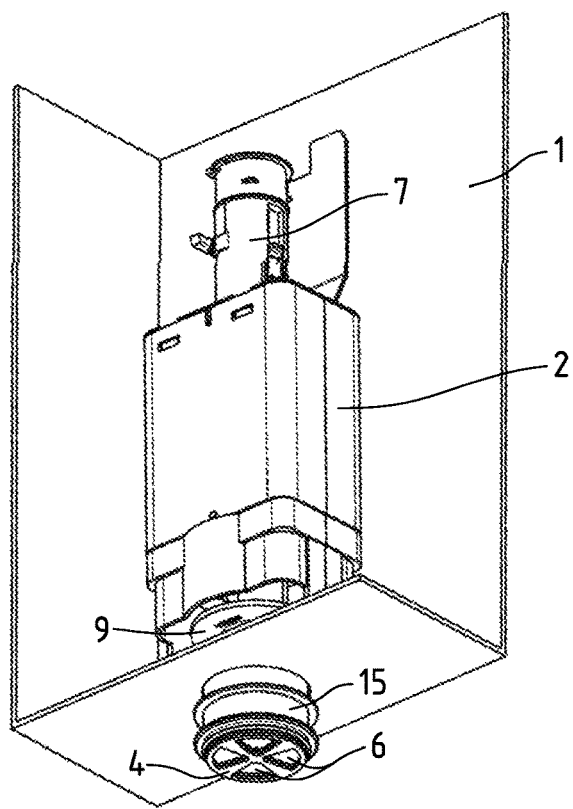
FIG. 2 is a view of the portion of the flush box from FIG. 1 from obliquely below, again in longitudinal section and in a perspective view, together with the drain valve that is arranged therein and comprises the flushing stream throttle.

A portion of a sanitary flush box 1 is shown in FIGS. 1 and 2. The base of the flush box 1 is provided with a tubular connection piece 15, into which a drain connection 5 of a drain valve 2 can be, or is, inserted. At least one annular groove is formed in the lateral surface of the drain connection 5, into which groove a rubber-elastic sealing ring is inserted that seals the drain connection 5 of the drain valve 2 with respect to the connection piece of the flush box 1 in a liquid-tight manner. A valve seat 3 is formed on the drain connection 5.

The valve seat 3 is connected to the valve mounting of the drain valve 2 by spacers 8. The spacers 8 are web-shaped and attached to the drain connection 5, preferably integrally moulded thereon. Said spacers have a web portion projecting radially outwardly from the drain connection 5 and an adjoining web portion extending substantially vertically. The lower part of the valve mounting above the spacers 8 is substantially sleeve-shaped or hollow-cylindrical.

Associated with the valve seat 3 is a valve member 7, which is configured as an overflow pipe and is axially movably guided in the valve mounting. At its lower end, the valve member 7 has an annular sealing surface or seal 9. In the closed state of the drain valve 2, the sealing surface or seal 9 rests on the valve seat 3. In the open state of the drain valve 2, the valve member 7 is raised together with the seal 9 fastened thereon, and therefore the seal 9 frees the through-opening delimited by the valve seat 3. The drain valve 2 is shown in the open state in FIGS. 1 and 2.

Inserted in the drain connection 5 of the drain valve 2 or in the connection piece 15 of the flush box 1 is a throttle device, by means of which the flushing stream flowing from the flush box 1 when the drain valve is open can be variably adjusted. The throttle device is formed by a throttle 4, which defines at least on free flow cross section 6.

The throttle 4, viewed in the flushing stream flow direction, is arranged behind the valve seat 3 on or in the drain connection 5 of the drain valve 2 or in the connection piece 15 of the flush box 1 receiving the drain connection 5. Said throttle has two throttle elements 4.1, 4.2, one of which can be rotated relative to the other. In the embodiment shown in FIGS. 2 to 4, the throttle 4 defines four free flow cross sections 6. The size of the free flow cross sections 6 can be variably changed by rotating the throttle element 4.1 relative to the throttle element 4.2.

The throttle elements 4.1, 4.2 are preferably substantially disc-shaped and have web-shaped portions 4.11, 4.21, which taper towards the rotational axis 12 of the rotatable throttle element 4.1. Furthermore, the web-shaped portions 4.11, 4.21 of the particular throttle element 4.1, 4.2 are preferably interconnected by an annular portion 4.3, 4.4 of the particular throttle element 4.1, 4.2. The web-shaped portions 4.11, 4.21 can also be referred to as webs or spokes.

The sanitary flush box 1 from FIGS. 1 and 2 is shown in a view from below in FIG. 3. The throttle 4 inserted into the connection piece 15 of the flush box 1 or into the drain connection 5 of the drain valve 2 is in a starting position in FIG. 3, in which the web-shaped portions 4.11, 4.21 of the two throttle elements 4.1, 4.2 overlap in such a way that the free flow cross sections 6 delimited by the web-shaped portions 4.11, 4.21 have a maximum size.

Instead of four web-shaped portions (spokes) 4.11, 4.21, the particular substantially disc-shaped throttle element 4.1, 4.2 may also have only two, three or more than four web-shaped portions.

Figure 3:
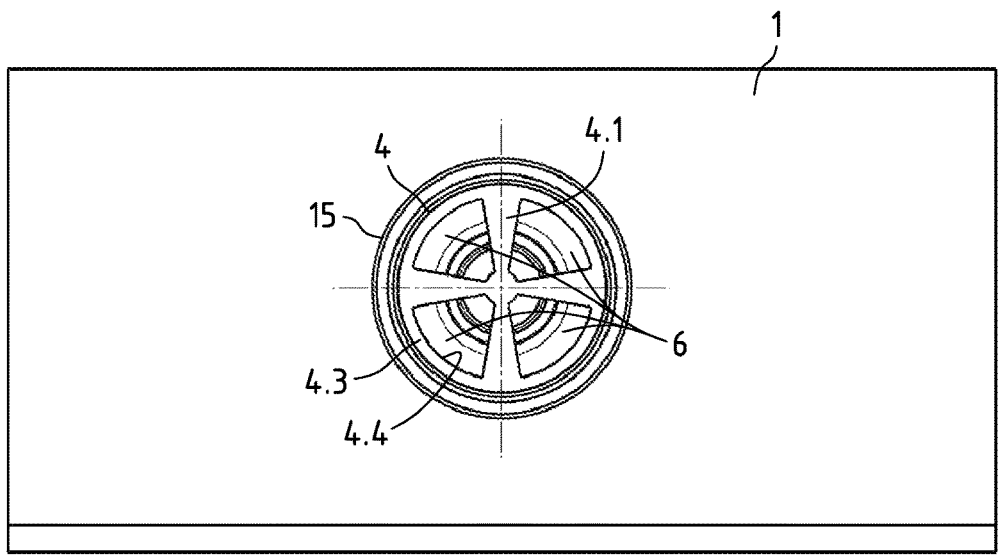
FIG. 3 is a view of the flush box from FIGS. 1 and 2 from below, web-shaped portions of two disc-shaped throttle elements overlapping one another.
Figure 4:
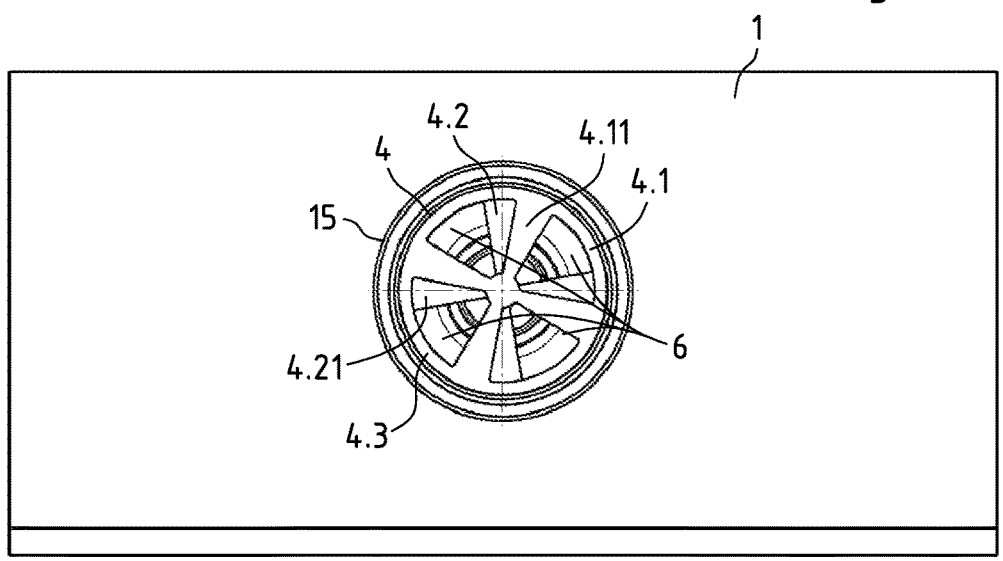
FIG. 4 is a view of the flush box from FIGS. 1 to 3 from below, the disc-shaped throttle elements of the flushing stream throttle having been rotated relative to one another.

The same view as in FIG. 3 is shown in FIG. 4, but with the difference that the rotatable disc-shaped throttle element 4.1 of the throttle 4 has been rotated by a specific amount relative to the other disc-shaped throttle element 4.2, and the free flow cross sections 6 delimited by the web-shaped portions have been reduced. The web-shaped portions 4.11, 4.21 of the throttle elements 4.1, 4.2 are configured in such a way that, at maximum reduction, a certain minimum size of the free flow cross sections 6 is not fallen below.

Figure 5:
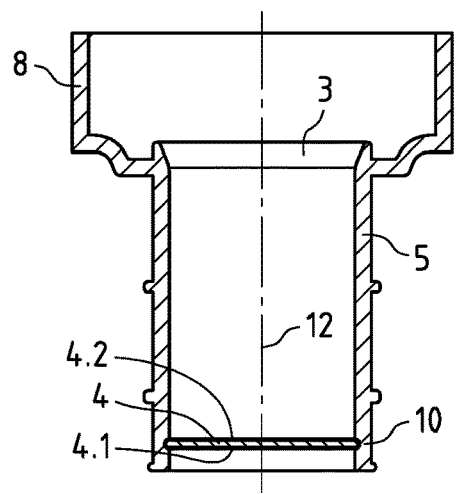
FIG. 5 is an axial sectional view of a lower portion of a drain valve for a sanitary flush box, comprising a drain connection having a valve seat, and a variable flushing stream throttle positively held therein.

FIG. 5 is an axial sectional view of the drain connection 5 of a drain valve for a sanitary flush box. In this embodiment, the drain connection 5 has a support 10, preferably an annular groove, which is used to positively fix the throttle 4 in position. This structural embodiment makes it possible to mount the throttle 4 according to the invention in a simple and economical manner.

A further embodiment of a device or throttle 4 according to the invention for variably adjusting the flushing stream from a sanitary flush box is shown in FIGS. 6 to 9. The flushing stream throttle 4 is composed of a first throttle element 4.2 in the form of an annular insert, a second throttle element 4.1 rotatably connected to the first throttle element 4.2, and a handle 11. The second throttle element 4.1 can also be referred to as a through-flow quantity limiter.

The first throttle element 4.2 is open at the top and bottom and, on its lower side, has three web-shaped portions 4.21. The second throttle element 4.1 is clipped to the first throttle element 4.2 and also has three web-shaped portions 4.11. In a starting position (or zero position) shown in FIGS. 7 and 8, the web-shaped portions 4.11, 4.21 lie congruently one above the other, such that the free flow cross sections 6 delimited by the web-shaped portions 4.11, 4.21 have a predetermined maximum size. By rotating the through-flow quantity limiter, the web-shaped portions 4.11, 4.21 are pivoted relative to one another, as a result of which the free flow cross sections 6 are reduced stepwise or continuously. As a result, the flushing stream (volume stream of the flushing water) from the flush box into the connected toilet or urinal ware is variably reduced. The rotation of the throttle element 4.1 relative to the throttle element 4.2 is shown by the arrow 13 in FIG. 9. The web-shaped portions 4.11, 4.21 of the throttle elements 4.1, 4.2 tapering towards the rotational axis 12 may, as shown in this embodiment, each have a substantially T-shaped cross-sectional profile.

The clipping of the two throttle elements 4.1, 4.2 can be seen in particular in FIG. 6. The rotatable throttle element 4.1, on its annular portion 4.3 connecting the web-shaped portions 4.11, has radially inwardly projecting regions 4.31, on which radially outwardly projecting latching lugs 4.32 are formed. The latching lugs 4.32 each engage behind a radially inwardly projecting shoulder 4.41, which is formed on the inside of the annular portion 4.4 of the first throttle element 4.2 (annular insert).

Furthermore, latching elements 4.5, 4.6, which secure the adjusted position of the rotatable throttle element 4.1 relative to the other throttle element 4.2 and therefore prevent unintended rotation of the throttle element 4.1 in the mounted state of the throttle 4, may be formed on the mutually facing end edges of the throttle elements 4.1, 4.2.

The, for example, bar-shaped or tubular handle 11 is used as a mounting aid for inserting the throttle 4 into the connection piece of the flush box 1 or into the drain connection 5 of the drain valve 2. The handle 11 is detachably connected to the throttle 4. The detachable connection is, for example, configured as a clamp connection, the throttle element 4.2 having a clamp receiving portion (clamp support) 14 for the handle 11.

The invention is not limited to the embodiments shown in the drawings. Rather, further variants are conceivable that make use of the invention set out in the claims, even if their form is different from the examples shown.

The invention claimed is:

1. A device for reducing the flushing stream from a sanitary flush box, the sanitary flush box comprising:
   a drain valve comprising a valve mounting and a valve member having a sealing surface or seal, the valve member movably mounted in the valve mounting;
   a drain connection, and a valve seat formed on the drain connection, the sealing surface or seal resting on the valve seat in the closed state of the drain valve and, in the open state of the drain valve, freeing an outlet opening delimited by the drain connection;
   wherein the device comprises a throttle, which defines at least one free flow cross section, wherein the throttle is configured to be arranged on the opposite side of the valve seat as the valve member in the drain connection of the drain valve or in a connection piece receiving the drain connection;
   wherein the throttle comprises at least two throttle elements, a second of the throttle elements configured to be rotated relative to a first of the throttle elements such that rotation of the second of the throttle elements relative to the first of the throttle elements changes the size of the at least one free flow cross section,
   wherein each of the at least two throttle elements comprises one or more latching elements, the one more latching elements of the first of the throttle elements arranged on a curved sidewall of the first of the throttle elements, the one or more latching elements of the second of the throttle elements arranged on a curved sidewall of the second of the throttle elements, the one or more latching elements of the first of the throttle elements configured to engage the one or more latching elements of the second of the throttle elements to allow rotation of the second of the throttle elements in latching steps to change the size of the at least one free flow cross section,
   wherein the one or more latching elements of the first and second of the throttle elements are configured to secure the position of the second of the throttle elements relative to the position of the first of the throttle elements to prevent unintended rotation of the second of the throttle elements in a mounted state of the throttle, and
   wherein at least one of the throttle elements is provided with a handle for aiding insertion of the throttle into the connection piece of the flush box or into the drain connection of the drain valve.

2. The device according to claim 1, wherein the at least two throttle elements are disc-shaped and have web-shaped portions, and wherein the at least one free flow cross section defines at least two free flow cross sections that taper towards the rotational axis of the second throttle element.

3. The device according to claim 2, wherein the web-shaped portions of at least one of the throttle elements are interconnected by an annular portion.

4. The device according to claim 1, wherein the handle has a detachable connection to one of the at least two throttle elements.

5. The device according to claim 1, wherein the detachable connection of the handle comprises at least one of a frictional plug-in connection, a bayonet connection, or a threaded connection.

6. The device according to claim 1, wherein the second of the throttle elements is clipped to the first of the throttle elements.

7. The device according to claim 3, wherein the web-shaped portions of the second of the throttle elements are interconnected by an annular portion,
wherein the annular portion of the second of the throttle elements connecting the web-shaped portions comprises radially inwardly projecting regions, on which radially outwardly projecting latching lugs are formed, and
wherein the latching lugs each engage behind a radially inwardly projecting shoulder formed on the inside of the annular portion of the first of the throttle elements.

8. A drain valve for a sanitary flush box, comprising;
a valve mounting;
a valve member that has a sealing surface or seal and is movably mounted in the valve mounting;
a drain connection;
a valve seat formed on the drain connection, the sealing surface or seal resting on the valve seat in the closed state of the drain valve and, in the open state of the drain valve, freeing an outlet opening delimited by the drain connection, and;
a throttle, which defines at least one free flow cross section, wherein the throttle is arranged on the opposite side of the valve seat as the valve member in an annular groove of the drain connection of the drain valve, the annular groove axially fixing the throttle in the drain connection;
wherein the throttle comprises at least two throttle elements, a second of the throttle elements configured to be rotated relative to a first of the throttle elements such that, the size of the at least one free flow cross section can be changed,
wherein each of the at least two throttle elements comprises one or more latching elements, the one more latching elements of the first of the throttle elements arranged on an end edge facing the one or more latching elements of the second of the throttle elements, the one or more latching elements of the first of the throttle elements configured to engage the one or more latching elements of the second of the throttle elements to allow rotation of the second of the throttle elements in latching steps to change the size of the at least one free flow cross section, and
wherein the one or more latching elements of the first and second of the throttle elements are configured to secure the position of the second of the throttle elements relative to the position of the first of the throttle elements to prevent unintended rotation of the second of the throttle elements in a mounted state of the throttle.

9. The drain valve according to claim 8, wherein the at least two throttle elements are disc-shaped and have web-shaped portions, and wherein the at least one free flow cross section defines at least two free flow cross sections that taper towards the rotational axis of the rotatable throttle element.

10. The drain valve according to claim 9, wherein at least one of the throttle elements is configured to be positively inserted into the drain connection.

11. A sanitary flush box, comprising: a connection piece, into which a drain connection of a drain valve can be inserted;
wherein the drain valve comprises a valve mounting, a valve member that has a sealing surface or seal and is movably mounted in the valve mounting, and a valve seat formed on the drain connection, the sealing surface or seal resting on the valve seat in the closed state of the drain valve and, in the open state of the drain valve, freeing an outlet opening delimited by the drain connection;
wherein the flush box comprises a throttle, which defines at least one free flow cross section, wherein the throttle is arranged on the opposite side of the valve seat as the valve member in an annular groove of the connection piece of the flush box receiving the drain connection, the annular groove axially fixing the throttle in the connecting piece;
wherein the throttle comprises at least two throttle elements, a second of the throttle elements configured to be rotated relative to a first of the throttle elements such that the size of the at least one free flow cross section can be changed;
wherein each of the at least two throttle elements comprises one or more latching elements, the one more latching elements of the first of the throttle elements arranged on an end edge facing the one or more latching elements of the second of the throttle elements, the one or more latching elements of the first of the throttle elements configured to engage the one or more latching elements of the second of the throttle elements to allow rotation of the second of the throttle elements in latching steps to change the size of the at least one free flow cross section; and
wherein the one or more latching elements of the first and second of the throttle elements are configured to secure the position of the second of the throttle elements relative to the position of the first of the throttle elements to prevent unintended rotation of the second of the throttle elements in a mounted state of the throttle.

12. The flush box according to claim 11, wherein the at least two throttle elements are disc-shaped and have web-shaped portions, and wherein the at least one free flow cross section defines at least two free flow cross sections that taper towards the rotational axis of the second throttle element.

13. The flush box according to claim 12, wherein at least one of the throttle elements is configured to be positively inserted into the connection piece.

\* \* \* \* \*